Feb. 8, 1955             L. GESS             2,701,857

CONTROLLER FOR REVERSIBLE ELECTRIC MOTORS

Filed Dec. 14, 1950             3 Sheets-Sheet 1

INVENTOR.
LOUIS GESS

BY *Arthur H. Swanson*

ATTORNEY.

Feb. 8, 1955 L. GESS 2,701,857
CONTROLLER FOR REVERSIBLE ELECTRIC MOTORS
Filed Dec. 14, 1950 3 Sheets-Sheet 2

INVENTOR.
LOUIS GESS
BY Arthur H. Swanson
ATTORNEY.

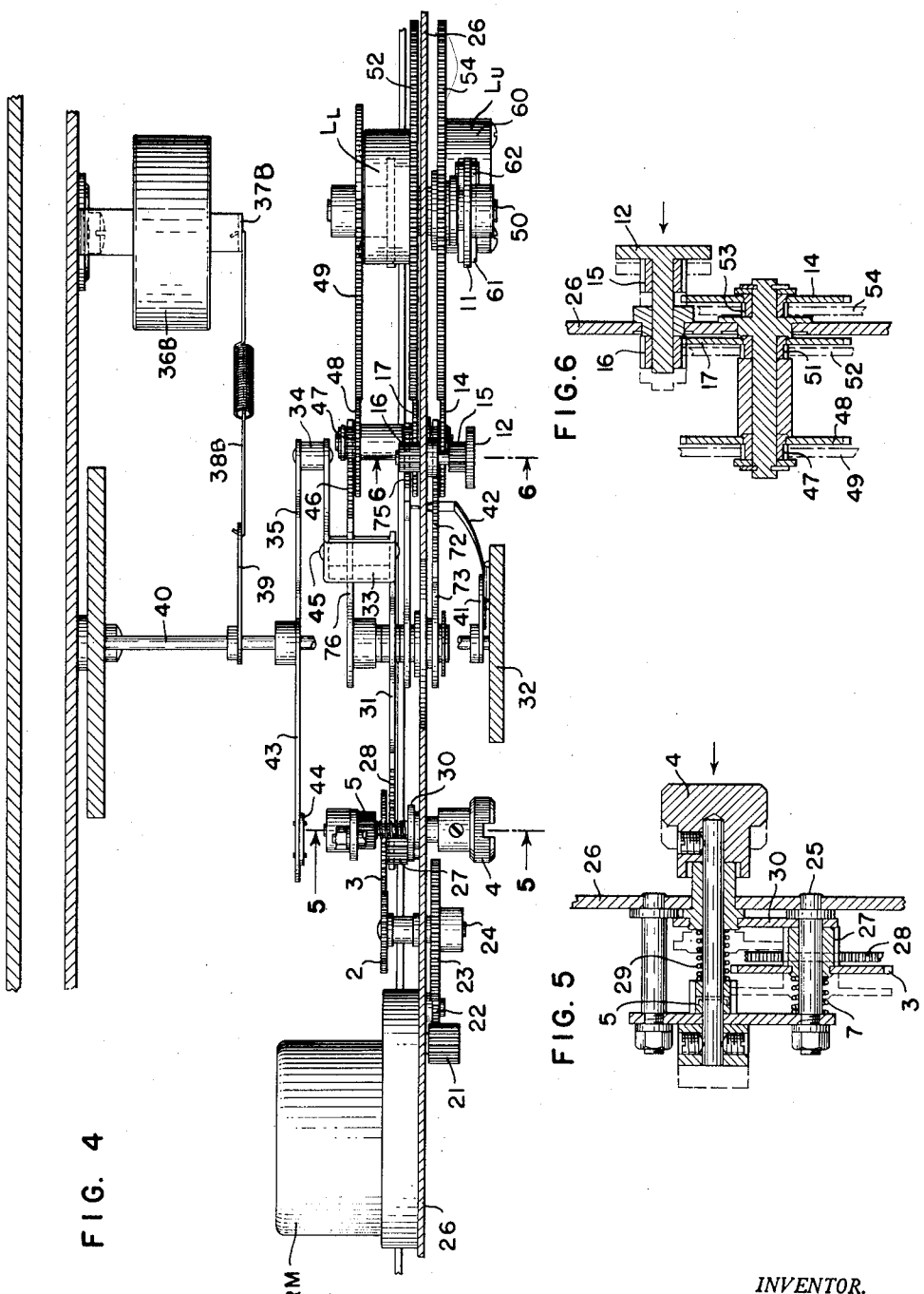

United States Patent Office 2,701,857
Patented Feb. 8, 1955

2,701,857

CONTROLLER FOR REVERSIBLE ELECTRIC MOTORS

Louis Gess, Jenkintown, Pa., assignor to Minneapolis-Honeywell Regulator Company, Minneapolis, Minn., a corporation of Delaware Application December 14, 1950, Serial No. 200,762

1 Claim. (Cl. 318—285)

This invention relates to an automatic controller for industrial processes having means for adjusting its set point in accordance with a time pattern.

It is an object of this invention to provide such an automatic controller (either electrically or pneumatically operated) having a reversible electric motor, means for varying the speed of said motor, means for varying the time of operation of said motor, one or more manually set limit switches adapted to be engaged by said motor at either end of its path of travel and to reverse the direction of movement of said motor and consequently the direction to which the set point of the controller is adjusted, and indicators connected to and manually set by the same handle as the limit switches, these indicators denoting the positions of the limit switches and hence the values of the controlled variable, to which the controller is limited.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 4 is a horizontal cross section from Fig. 3 on line 4—4 looking in the direction of the arrows.

Fig. 5 is a vertical cross section on an enlarged scale from Fig. 4 on line 5—5 looking in the direction of the arrows.

Fig. 6 is a vertical cross section on the same enlarged scale as Fig. 5 from Fig. 4 on the line 6—6 looking in the direction of the arrows.

General description

Figure 1:
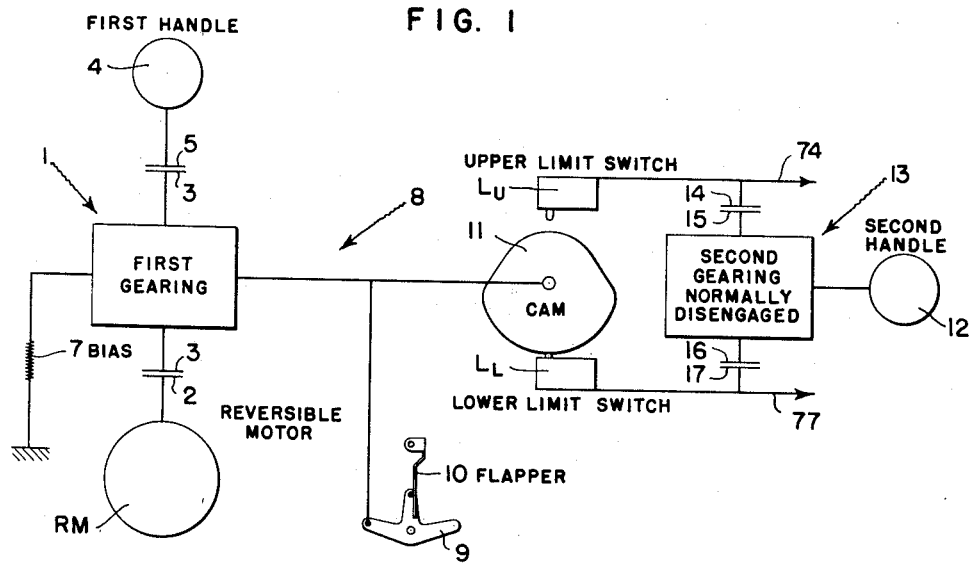
Fig. 1 is a block diagram showing the mechanical elements.

Fig. 1 shows a reversible electric motor RM which connects to a train of gearing, generally indicated at 1, having a pair of gears 2 and 3 which may be engaged or disengaged by the actuation of first handle 4. Handle 4 also causes a second pair of gears 3 and 5 to engage or disengage. A spring 7 biases gears 2 and 3 towards engagement and gears 3 and 5 out of engagement. The output of first gear train 1 is connected through a mechanism, generally indicated at 8, to the three-armed lever 9, which actuates flapper 10, and to cam 11. Cam 11 is located between an upper limit switch $L_U$ and a lower limit switch $L_L$. A second handle 12 is selectively connected to a second train of gearing, generally indicated at 13. Gearing 13 contains two pairs of normally disengaged gears 14—15 and 16—17. Handle 12 is operable to engage gears 14 and 15 or to engage gears 16 and 17 and thereby connect switch $L_U$ or switch $L_L$ so as to be mechanically connected to and hence adjustable by rotation of handle 12. Indicator 74 is mechanically connected to upper limit switch $L_U$ and indicator 77 is mechanically connected to lower limit switch $L_L$. Indicators 74 and 77 cooperate with a chart or other scale to denote the positions of the limit switches. These limit switches cause the controller to hold the controlled variable between certain limits. Hence the positions of these limit switches may be calibrated in the values of the controlled variable.

Figure 2:
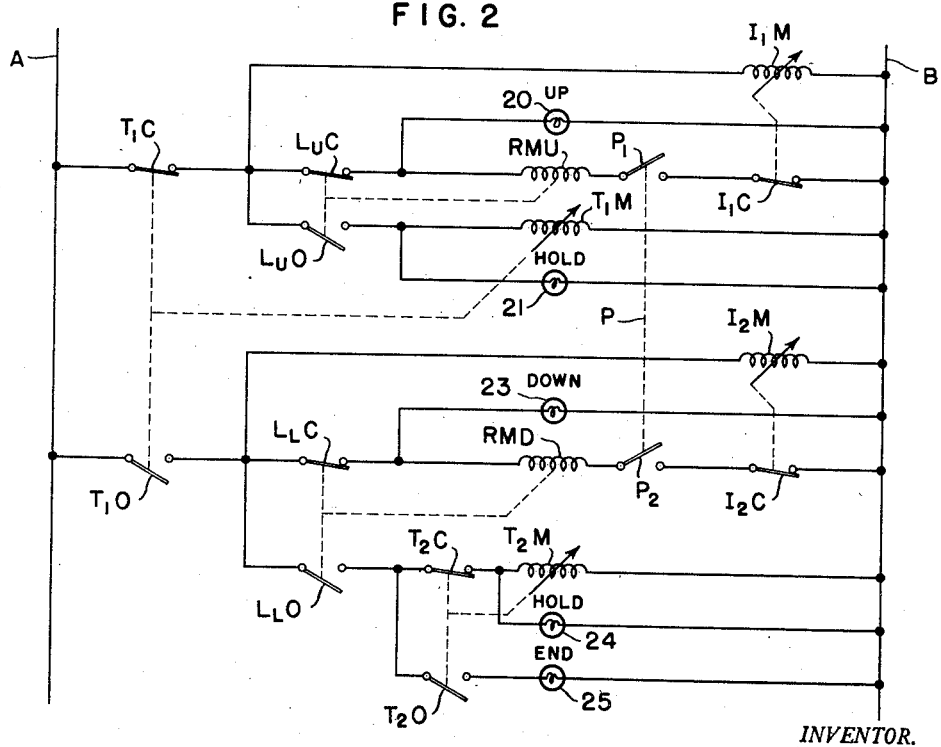
Fig. 2 is an electric circuit diagram.
Figure 3:
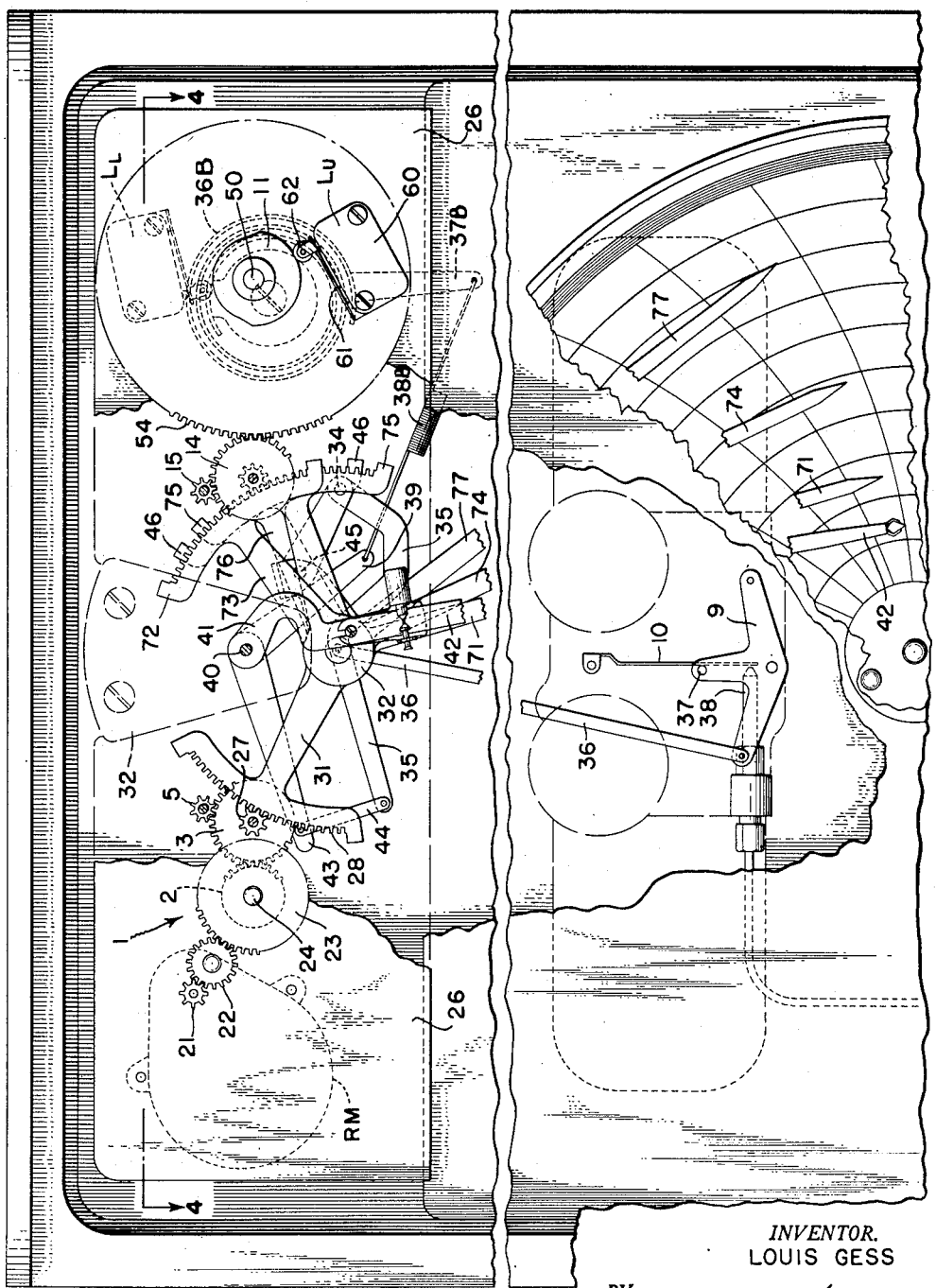
Fig. 3 is a front elevation of a controller with parts broken away.

Fig. 2 shows the line wires A and B across which is connected a double pole, single throw power switch P having movable switch blades $P_1$ and $P_2$. Blade $P_1$ is connected in series with winding RMU, which is the up or forward winding of motor RM, and also in series with contact $I_1C$, which is driven by winding $I_1M$ of an interrupter motor. The interrupter motor also has a winding $I_2M$ which drives a second interrupter contact $I_2C$. A fourth contact in series across the line is $L_UC$ which is the normally closed contact of the upper limit switch $L_U$. In series with all the contacts already mentioned is contact $T_1C$ which is a normally closed contact adapted to be opened by winding $T_1M$ of a timing motor.

A second, normally open contact $T_1O$ driven by winding $T_1M$ of the timing motor is connected across the line in series with three main branches. One of these branches contains winding $I_2M$ of the interrupter motor. The second of these branches contains a normally closed contact $L_LC$, the winding RMD, which is the reverse or down winding of the reversible motor RM, movable element $P_2$ of the power switch P, and the contacts $I_2C$ of the interrupter motor.

A third branch of this circuit contains contact $L_LO$ which is a normally open contact of the lower limit switch $L_L$. This branch then itself divides. The upper sub-branch contains contact $T_2C$ which is a normally closed contact operated by the winding $T_2M$ which is in series with it. Winding $T_2M$ also operates to close normally open contact $T_TO$ which is in the second sub-branch.

Operation

When it is desired to operate the controller of the present invention according to a preselected time pattern or cycle, power switch P is manually operated to close movable elements $P_1$ and $P_2$. Closure of $P_1$ energizes winding RMU because contacts $T_1C$, $L_UC$, winding RMU, $P_1$, and contact $I_1C$ are all connected in series across the power lines A and B and these contacts are normally closed. Closure of switch $P_2$ does not energize winding RMD because contact $T_1O$ is normally open.

The interrupter motor having windings $I_1M$ and $I_2M$ is normally energized and runs constantly to interrupt contacts $I_1C$ at a relatively high frequency. This interruption of contacts $I_1C$ varies the frequency of the unidirectional or alternating current which is fed to winding RMU and consequently varies the speed at which motor RM moves in its forward or up direction. An electric light 20 or other signal is connected in parallel with winding RMU and indicates when the motor RM is running in the forward or up direction. Motor RMU moves at a speed governed by the winding $I_1M$ until cam 11 (Fig. 1) engages the upper limit switch $L_U$, at which time the normally closed contact $L_UC$ is opened and the normally open contact $L_UO$ is closed.

Opening contact $L_UC$ deenergizes winding RMU. Closing contact $L_UO$ energizes winding $T_1M$ of an electric timing motor and simultaneously energizes a second electric light 21 or other indicia which indicates the time during which the controller is held at the value so obtained. Winding $T_1M$ runs for a selected period of time which is adjustable by means of a cam or other manual adjustment. At the end of this time winding $T_1M$ opens contact $T_1C$ and closes contact $T_1O$.

Opening contact $T_1C$ deenergizes winding $T_1M$ and winding $I_1M$. Closing contact $T_1O$ energizes winding $I_2M$ and also energizes winding RMD which is the reverse or down winding of motor RM. Simultaneously, a third light 23 or other signal is energized to indicate the period of time during which the motor operates in the reverse or down direction. Contacts $T_1O$, $L_LC$, winding RMD, movable switch element $P_2$, and contact $I_2C$, are all connected in series and these contacts are normally closed except $T_1O$ which is now closed. Since winding RMD is now energized, motor RM moves in the reverse or down direction at a speed controlled by interrupter motor winding $I_2M$ because of the interruptions of contact $I_2C$. Motor RM continues to move in the down direction until cam 11 (Fig. 1) engages the lower limit switch $L_L$, opens contact $L_LC$, and closes contact $L_LO$.

Opening contact L$_L$C deenergizes winding RMD. Closing contact L$_L$O energizes winding T$_2$M of the timing motor. Simultaneously, a fourth lamp 24 or other signal is energized to indicate the period of time during which the timing motor holds the controller at the value of the variable so selected. Winding T$_2$M operates for a period of time which is manually adjustable.

At the end of this preselected period of time, winding T$_2$M opens contact T$_2$C, which deenergizes winding T$_2$M. Simultaneously, contact T$_2$O is closed to illuminate a fifth electric light 25 or other signal indicating the end of the cycle.

Detailed description

Referring now to Figs. 3, 4, 5, and 6, the controller is housed in a casing. Motor RM is mounted in this casing and has its output connected to a train of first gearing, generally indicated at 1. Gear train 1 consists of output pinion 21 and gears 22 and 23. Gear 23 is fast on shaft 24 which bears at its rear end gear 2 which meshes with gear 3. Fig. 5 shows that gear 3 is mounted for rotation and axial sliding movement on shaft 25 which is carried by stationary bracket 26. Gear 3 has fastened to it a pinion 27 which meshes with a gear segment 28. Also slidably mounted in bracket 26 is handle 4 which is stressed toward its outer position by a spring 29 and bears at its inward end gear 5. When handle 4 is pressed inward (to the left in Fig. 5), bracket 30, secured to handle 4, compresses spring 29 and moves pinion 27 in sliding contact with sector 28 but moves gear 3 out of contact with gear 2 (Fig. 4) and into contact with gear 5. Disengagement of gears 2 and 3 breaks the normal connection between motor RM and gear train 1. Engagement of gears 5 and 3 closes mechanical engagement between handle 4 and gear train 1 so that flapper 10 (and consequently the set point of the controller) can be adjusted by turning handle 4. Spring 7 (Figs. 1 and 5) normally biases gear 3 out of engagement with gear 5 and into engagement with gear 2 (Fig. 2).

Gear segment 28 forms the end of one arm 31 of a lever pivoted about axis 32. Fig. 2 shows that this lever has a portion 33 which is pivoted at 34 to a floating lever 35.

A spiral or Bourdon tube 36B forms the measuring element of the controller and may be actuated by pressure so as to measure that pressure directly or may be actuated from a temperature-measuring bulb so as to measure the temperature. Spiral 36B has an arm 37B connected by a spring link 38B to arm 39 of a three-armed lever pivoted at 40. Arm 41 of this three-armed lever has a pen arm 42 mounted thereon. The third arm 43 of this lever is pivotally connected by means of a link 44 to the other end of the floating lever 35. Intermediate its ends floating lever 35 has pivotally connected thereto a link 36 which, at its lower end, is attached to one arm of a three-armed lever 9 which carries a pin 37 engaging flapper 10 which cooperates with nozzle 38 of the air-operated controller. This air-operated controller is of a well known commercial type and is not described further herein since its details form no part of the present invention.

Fig. 4 shows connection 45 fastening lever portion 33 to a second gear segment 46 which turns about axis 32 and which meshes with a pinion 47 which, in turn, meshes with gears 48 and 49, which are connected to shaft 50 upon which cam 11 is securely mounted so that it rotates with shaft 50. The gear train from gear 3 to three-armed lever 9 and to cam 11 forms the mechanism 8 (Fig. 1) and provides the driving connection between motor RM or first handle 4 and flapper 10 and cam 11.

Connected to lever arm 31 and lever portion 33 is lever arm 71 which pivots about axis 32 so as to indicate the set point of the controller or the normal, at-rest position of flapper 10.

Fig. 6 shows second handle 12 slidably mounted in the stationary bracket 26 and carrying gears 15 and 16 fast on it. As shown in Fig. 6, gear 16 meshes with gear 17 which is fixedly secured to pinion 51 which, in turn, meshes with a large circular gear 52 forming the rim or edge of the disc on which the lower limit switch L$_L$ is mounted. Gear 15 is shown in Fig. 6 out of mesh with gear 14 which is secured to pinion 53. Pinion 53, in turn, meshes with a large circular gear 54 which forms the edge or rim of a disc on which the upper limit switch L$_U$ is mounted.

The limit switches L$_L$ and L$_U$ are single pole, double throw switches comprising a casing 60 on which is mounted a spring 61 carrying at its end a roller 62 which engages cam 11. Such switches are well known commercial devices and need not be described in further detail.

Meshing with gear 14 is a gear train whose last gear meshes with a third gear segment 72 pivoted on arm 73 about axis 32 and having an arm 74 which indicates the location of the upper limit switch L$_U$.

Meshing with gear 17 is a gear train whose last gear meshes with a fourth gear segment 75 pivoted on arm 76 about axis 32 and having an arm 77 which indicates the location of the lower limit switch L$_L$.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

Means for adjusting the set point of a controller to provide a time sequence of operations, including, a control-exercising element controlling the operations of said controller, a reversible motor, gearing connecting said motor to said element to provide a driving connection from said motor to said element, a handle for manually adjusting said element, a clutch controlling the connection between said handle and said gearing, a second clutch controlling the connection between said motor and said gearing, said clutches being under the control of said handle so that operation of said handle connects said handle to said gearing and disconnects said motor from said gearing, a cam driven by said gearing, a pair of limit switches each mounted adjacent said cam so as to be operated by said cam when said cam is in a selected position, manually adjustable means operable to vary the position in which said limit switches are operated by said cam, said limit switches controlling the connection between a source of power and said reversible motor and operable so as to energize or deenergize said motor when one or the other of said limit switches is in operative position, interrupter switches controlling the connection between said reversible motor and said source of power, and a timer motor intermittently operating said interrupter switches so as to vary the speed at which said reversible motor operates said controller.

References Cited in the file of this patent

UNITED STATES PATENTS

| | | |
|---|---|---|
| 1,839,934 | Stansbury | Jan. 5, 1932 |
| 1,936,763 | King | Nov. 28, 1933 |
| 2,315,582 | Blodgett | Apr. 6, 1943 |
| 2,520,492 | Colegrove | Aug. 29, 1950 |
| 2,551,395 | Rimann | May 1, 1951 |